United States Patent [19]
Patterson et al.

[11] Patent Number: 5,688,015
[45] Date of Patent: Nov. 18, 1997

[54] WATER SEAL LINER FOR VEHICLE DOOR

[75] Inventors: Thomas M. Patterson, Taylor; Richard F. Biermacher, Goodrich; Gary K. Mannke, Grosse Ile, all of Mich.

[73] Assignee: Chrysler Corporation, Auburn Hills, Mich.

[21] Appl. No.: 664,945

[22] Filed: Jun. 17, 1996

[51] Int. Cl.[6] .............................. B32B 3/28; B60R 27/00
[52] U.S. Cl. ........................... 296/39.1; 296/154; 428/80
[58] Field of Search ............................ 296/39.1, 146.7, 296/152, 154; 277/178; 428/80

[56] References Cited

U.S. PATENT DOCUMENTS

| | | | |
|---|---|---|---|
| 3,526,000 | 8/1970 | Williams | 156/82 |
| 4,277,533 | 7/1981 | Kumins et al. | 428/332 |
| 4,458,043 | 7/1984 | Evans et al. | 524/66 |
| 4,957,803 | 9/1990 | Foley | 428/80 X |
| 5,090,762 | 2/1992 | Krieger | 428/80 X |
| 5,246,755 | 9/1993 | Tahara et al. | 428/40 |
| 5,407,632 | 4/1995 | Constantino et al. | 264/545 |
| 5,409,779 | 4/1995 | Puckett et al. | 428/500 |
| 5,482,343 | 1/1996 | Bradac | 296/39.1 |

*Primary Examiner*—David M. Mitchell
*Assistant Examiner*—Kia M. Robinson
*Attorney, Agent, or Firm*—Thomas G. Pasternak

[57] ABSTRACT

A liner made of water sealing material is formed with a plurality of pockets. Each pocket is cut, and then the liner disposed next to the door with a respective pocket positioned over a component of a vehicle door to be sealed, e.g., a lock shaft. The pocket is collapsed around the component such that the excess material established by the now-collapsed pocket overlaps around the component, thereby establishing a water seal around the component.

9 Claims, 1 Drawing Sheet

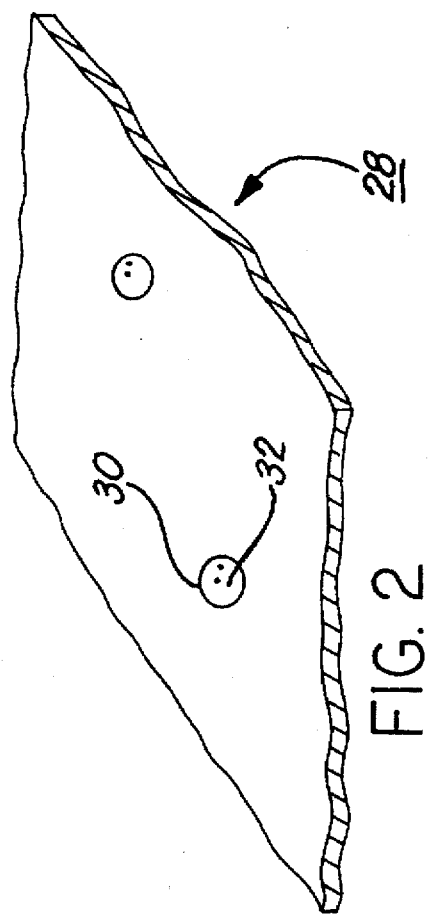
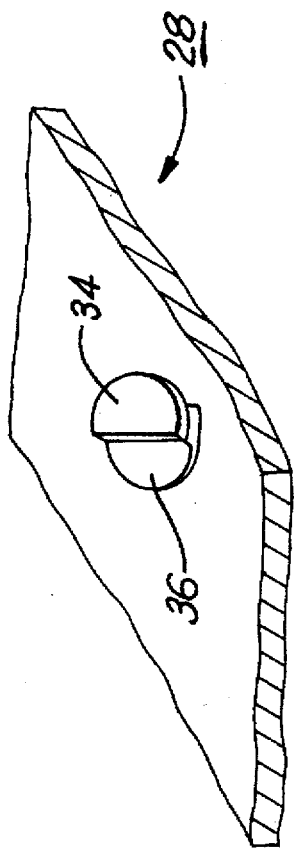
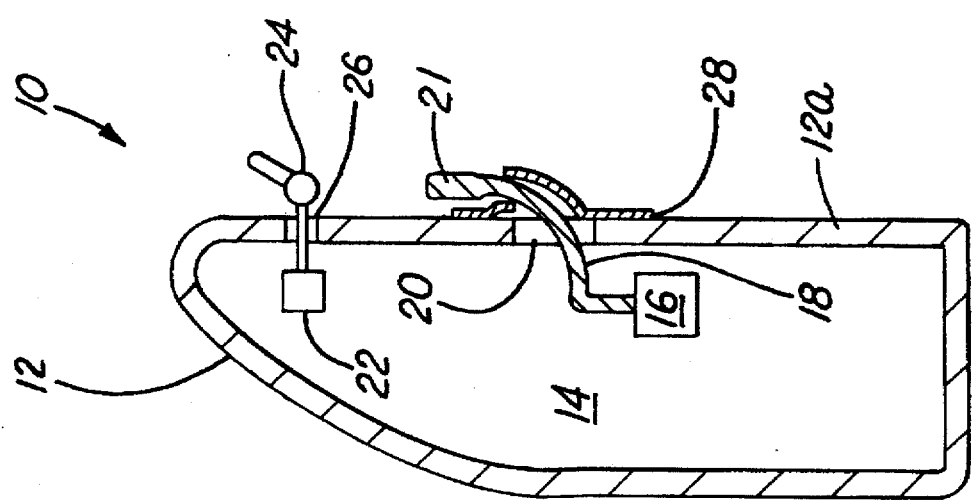

5,688,015

WATER SEAL LINER FOR VEHICLE DOOR

FIELD OF INVENTION

The present invention relates generally to vehicle doors, and more particularly to methods and apparatus for establishing a water seal for a door interior.

BACKGROUND OF THE INVENTION

Vehicle doors typically have several openings through which operator controls are received. Such operator controls include components such as door lock operators and window operators. The operator controls are coupled to mechanisms within the door to facilitate operation of the mechanisms for locking the door, opening and closing the window, and so on.

It will readily be appreciated that water or other liquid can leak from the door interior into the passenger compartment through the operator control openings. Such leakage is undesirable because it is annoying to the vehicle occupants and can result in damage to components within the passenger compartment. Accordingly, it is necessary to prevent water leakage from the interior of vehicle doors.

Not surprisingly, waterproof liners have been provided that are attached to vehicle doors within the door interiors, to prevent water leakage from the door interiors. While somewhat effective in reducing leakage, however, some leakage through current liners nevertheless occurs. This is because small openings in the liners must be formed to receive the operator controls therethrough, and water can leak through the small openings, around the peripheries of the operator controls. The leakage problem is particularly acute when the particular operator control is oriented vertically, with the corresponding opening in the liner consequently being oriented horizontally and thus promoting undesirable gravity drainage of water through the opening. As recognized by the present invention, however, it is possible to configure a vehicle door liner to substantially prevent water leakage through operator control openings that are formed in the liner.

Accordingly, it is an object of the present invention to provide a vehicle door liner which can receive operator controls therethrough. Another object of the present invention is to provide a vehicle door liner which substantially prevents water leakage through openings in the liner that are formed for receiving operator control controls therethrough. Yet another object of the present invention is to provide a vehicle door liner which is easy to use and cost-effective to manufacture.

SUMMARY OF THE INVENTION

A water sealing device is disclosed for a vehicle door having an interior and at least one operating mechanism partially disposed in the interior. The device includes a liner that is made of waterproof material. In accordance with principles discussed below, the liner is formed with at least one pocket in a manufacturing configuration, wherein the pocket includes a surface and the surface is continuous. Per the present invention, however, the pocket is frangible such that the pocket can assume a seal configuration, wherein the surface of the pocket includes first and second pocket portions for receiving a portion of the operating mechanism therebetween when the liner is disposed in the interior of the door. Thereby, the passage of water between the liner and the portion is inhibited.

Preferably, the liner is made of a single sheet of plastic. Thus, the present liner avoids the use of costly multiple layers that are laminated together and that could otherwise delaminate. As described below, the operating mechanism is selected from the group of mechanisms consisting of: door lock mechanisms, window operating mechanisms.

In another aspect, a vehicle incorporating the liner is disclosed.

In yet another aspect, a method for inhibiting water leakage past a portion of an operating mechanism into the interior of a vehicle includes providing a waterproof liner and disrupting a portion of the liner. Then, the liner is disposed in the interior of the vehicle door with the portion of the operating mechanism extending through the portion of the liner and with the liner overlapped around the portion of the operating mechanism to thereby inhibit the passage of water between the liner and the portion of the operating mechanism. Preferably, the method includes forming at least one pocket in the liner to establish the portion of the liner to be disrupted.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a cut away perspective view of a vehicle door incorporating the liner of the present invention, with portions of the operating mechanisms shown schematically;

FIG. 2 is a perspective view of the liner, with the pockets in the manufacture configuration; and FIG. 3 is a perspective view of the liner, showing a pocket in the seal configuration.

DETAILED DESCRIPTION OF THE PREFERRED EMBODIMENT

Referring initially to FIG. 1, a vehicle is shown, generally designated 10, which includes a door 12 having an interior 14 and one or more operating mechanisms 16 disposed therein by means well-known in the art. The particular operating mechanism 16 shown in FIG. 1 is a door lock operating mechanism including a door lock plunger shaft 18 that extends through an opening 20 of the door 12 and that terminates in a manipulable button 21. It is to be understood, however, that the operating mechanism of the present invention can be a window operating mechanism 22 which includes a manual crank 24 or power switch portion (not shown) that extends through an opening 26 of the door 12 and that is engaged with a window operating device within the interior 14 of the door 12 for raising and lowering a window associated with the door 12.

In cross-reference to FIGS. 1–3, a liner 28 is disposed by means well-known in the art next to the inside surface of a door panel 12a of the door 12. In one presently preferred embodiment, the liner 28 is made of a waterproof material such as plastic or the material sold by Cadillac Products under the trade name "Soundloc". The presently preferred liner 28 is single-ply, i.e., it includes only a single layer of material.

In accordance with the present invention, the liner 28 is formed during manufacturing with a plurality of hemispherically shaped pockets 30, as best shown in FIG. 2. More specifically, the pockets 30 are formed by disposing the liner 28 in a heated vacuum tool, and then vacuum-forming the pockets 30.

As shown in FIG. 2, the pockets 30, after manufacturing, assume a manufacturing configuration. In the manufacturing configuration, each pocket 30 includes a dome-shaped surface 32, and the surface 32 of each pocket 30 is continuous.

It is to be understood, however, that each pocket 30 is frangible and can consequently be disrupted, as by cutting, to assume a seal configuration, best shown in FIG. 3. In the seal configuration, the surface 32 of the pocket 30 is disrupted into overlapping semicircular pocket portions 34, 36. A portion of the operating mechanism can be received between the pocket portions 34, 36, e.g., the plunger shaft 18 can be received between the pocket portions 34, 36 when the liner 28 is disposed next to the surface of the door panel 12a of the door 12.

Accordingly, when in the seal configuration, the pocket portions 34, 36 of the pocket 30 overlap and partially bunch around the plunger shaft 18 to inhibit the passage of water between the liner 28 and the shaft 18, as best shown in FIG. 1. Thus, it will be appreciated that with the liner 28 disposed as shown, the plunger shaft 18 is installed by pushing the shaft 18 between the portions 34, 36 and opening 20 of the door 12. Because of the overlapping portions 34, 36, it will readily be appreciated in reference to FIG. 1 that the passage of water between the overlapping portions 34, 36 and shaft 18 is inhibited. Stated differently, when in the seal configuration the disrupted pocket 30 establishes a water shield around the shaft 18.

While the particular WATER SEAL LINER FOR VEHICLE DOOR as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A water sealing device for a vehicle door having an interior and at least one operating mechanism partially disposed in the interior, comprising:

a liner made of waterproof material, the liner being formed with at least one dome-shaped pocket in a manufacturing configuration, wherein the pocket includes a surface and the surface is continuous, the pocket being frangible such that the pocket can assume a seal configuration, wherein the surface of the pocket includes first and second pocket portions for receiving a portion of the operating mechanism therebetween when the liner is disposed next to the door to inhibit the passage of water between the liner and the portion of the operating mechanism.

2. The device of claim 1, wherein the liner is made of plastic.

3. The device of claim 2, wherein the liner includes only a single layer.

4. The device of claim 1, wherein the operating mechanism is selected from the group of mechanisms consisting of: door lock mechanisms, window operating mechanisms.

5. A vehicle, comprising:

a vehicle door having an interior and at least one operating mechanism partially disposed in the interior; and a liner made of waterproof material and disposed next to the door, the liner being formed with at least one pocket in a manufacturing configuration, wherein the pocket includes a dome-shaped surface and the surface is continuous, the pocket being frangible such that the pocket can assume a seal configuration, wherein the surface of the pocket includes first and second overlapping pocket portions for receiving a portion of the operating mechanism therebetween to inhibit the passage of water between the liner and the portion of the operating mechanism.

6. The vehicle of claim 5, wherein the liner is made of a single layer of plastic.

7. The vehicle of claim 6, wherein the operating mechanism is selected from the group of mechanisms consisting of: door lock mechanisms, window operating mechanisms.

8. A method for inhibiting water leakage past a portion of an operating mechanism into the interior of a vehicle, comprising the steps of:

(a) providing a waterproof liner;

(b) disrupting a dome-shaped portion of the liner; and (c) disposing the liner next to the vehicle door with the portion of the operating mechanism extending through the portion of the liner and with the liner overlapped around the portion of the operating mechanism to thereby inhibit the passage of water between the liner and the portion of the operating mechanism.

9. The method of claim 8, further comprising the step of forming at least one pocket in the liner to establish the portion of the liner to be disrupted.

* * * * *